June 23, 1959 G. O. HOTTOWE 2,891,344
FISHING FLASHER
Filed June 5, 1956
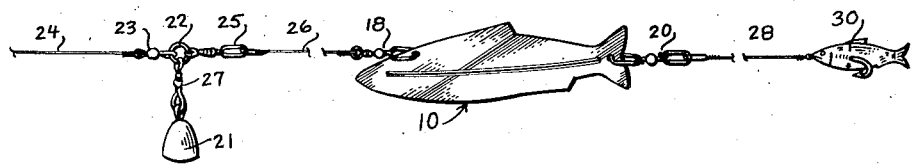
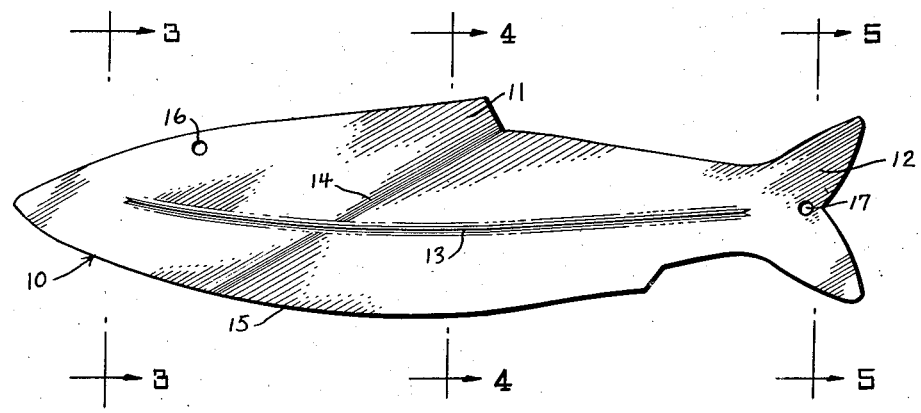
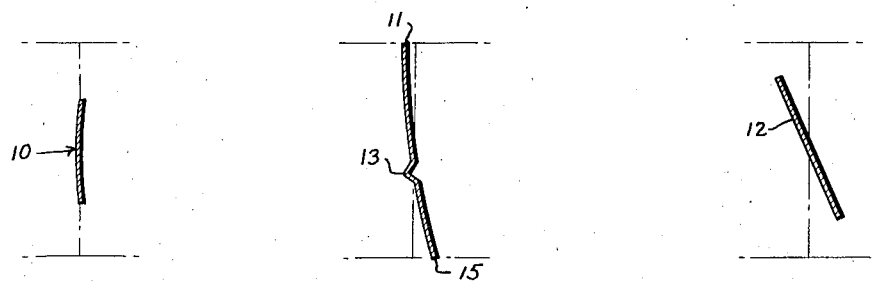
INVENTOR.
GEORGE O. HOTTOWE
BY
Attorneys

United States Patent Office 2,891,344
Patented June 23, 1959

2,891,344

FISHING FLASHER

George O. Hottowe, Mountlake Terrace, Wash.

Application June 5, 1956, Serial No. 589,520

2 Claims. (Cl. 43—42.5)

The present invention relates to salmon fishing flashers of the general type serving both to attract attention and to give action to spoons or bait trailed therebehind.

When a salmon feeds on schooled herring it usually slashes into the school and lashes with its tail to cripple as many herring as possible. It then goes back at its leisure and picks up the crippled herring that are moving along in a twisting irregular pattern as distinguished from their usual quick dart through the water. In an effort to cause the herring bait or other lure to imitate the action of such a wounded herring it has been common for salmon fishermen to use one of two general types of flashers, one of which may be classified as a spoon type and the other as a spinner type. The spoon type is generally rectangular in shape, sometimes rounded at the ends, and has its ends dished in opposite directions so that when the flasher is trolled at the proper speed and the lead is properly spaced therefrom, it will horizontally oscillate from side to side without turning over. By way of comparison, the spinner type is also generally rectangular in shape but is not dished or cupped like the spoon type. The spinner type is, however, usually bent oppositely at the ends somewhat like the letter S but with the forward part bent to a considerably less degree than the aft end. As a result, the spinner type constantly rotates with the aft end turning about a diameter approximating the length of the flasher and the front end turning about a lesser diameter.

The present invention aims to provide an improved flasher which will not only reflect light and give action to the trailed lure more effectively, but will also have an appearance and action simulating that of a salmon slashing into a herring school.

Other more particular objects and advantages will, together with these general objects, appear and be understood in the course of the following description and claims, the invention consisting in the novel construction and in the adaptation and combination of parts hereinafter described and claimed.

In the accompanying drawings:

Figure 1 is a side view illustrating a preferred hookup arrangement for my flasher.

Fig. 2 is a side view of the flasher as seen from its concave side;

Figs. 3 to 5 are vertical sectional views taken on the lines 3—3, 4—4, and 5—5, respectively, of Fig. 2; and Fig. 6 is a longitudinal top plan view of the flasher.

Referring to the drawings, it is seen that my flasher is designated 10 and is formed as from sheet metal stock to have the general outline of a salmon or other game fish. This outline may include a dorsal fin 11 along its back edge and a tail 12. A rib 13 extends longitudinally of the flasher through a major part of its length in substantial alignment with the nose extremity and the lateral center of the tail. As best indicated from Figs. 3 and 4, the flasher is gently laterally arched or cupped in the same direction as the arch of the rib 13. This arching continues from the nose to about the rear end of the rib whereafter the tail section of the flasher is substantially planar as shown by Fig. 5. The shape of the flasher is further complicated by way of the fact that the flasher is twisted so that it is also longitudinally arched toward the same general direction as it is laterally arched. In other words, if the rib 13 projects toward the right when facing from the tail toward the nose of the flasher, the right face of the flasher is convex both laterally and longitudinally speaking. The approximate line of twist or bend for the longitudinal arching is indicated by the shaded portion 14 in Fig. 2 and it will be noted that such slopes forwardly from the base of the dorsal fin 11 toward the belly edge 15 of the flasher. Thus, by way of analogy to screw terminology, the illustrated embodiment has a right-hand twist. It could just as well have a left-hand twist, but in this case the rib 13 and the flasher body proper perforce would be arched toward the left instead of the right.

A front opening 16 is provided for a pull line fitting and such is purposely adjacent the back edge of the lure and spaced from the nose. At the center of the tail there is provided an opening 17 for receiving a leader fitting. It should be noted that the area of the flasher below a line connecting openings 16, 17 is considerably greater than that thereabove so that the center of gravity of the flasher is below the line of pull. The pull line fitting may be a snap swivel 18 as shown in Fig. 1 and the leader fitting is desirably a double snap swivel 20. To complete a typical hookup a drop sinker 21 is placed about five feet in front of the flasher as by the use of a ring 22. This ring is connected by a swivel 23 to the line proper 24, by a snap swivel 25 to an intermediate pull line 26 leading to the snap swivel 18, and by a snap swivel 27 to the sinker. A leader 28 normally ranging from two to three feet in length leads from the double snap swivel 20 to the lure, denoted 30 and shown as a herring for purposes of example. Wire is preferred for the intermediate line 26 and it is desirable that the sinker be as light as will achieve the required depth.

The flasher may be brass, nickel, half-and-half, or enameled white, yellow, or any other desired color. The flasher is preferably formed from twenty-two gauge stock which holds its shape well after forming. I have found that the flasher is very effective when given about a twelve inch length.

When my flasher has a right-hand twist as shown and is trolled at the proper speed, it dives erratically downwardly to the left, lingers there for a moment and then surges upwardly while slipping sideways to the right. At the approximate extreme of its upward and right side travel it suddenly lunges or lashes a couple of times and then flips completely over in the clockwise direction with its tail slightly elevated. This flip is hardly detectable to the eye and together with the preceding lunges gives the illusion that the tail is lashing. At all other times, because its center of gravity is below the line of pull, the flasher tends to swim with its belly edge directly downwardly. The flasher then repeats its cycle. It must be remembered, however, that every cycle will be somewhat different due to variances in tidal disturbances, trolling speed, etc. It should be noted that because of the rearward spacing of the pull line opening 16 from the nose extremity of my flasher, the area of activity of the flashing during its cycle is about four or five times the area of a circle defined by the length of the flasher as a diameter. Also, this rearward spacing of opening 16 tends to cause the nose of the flasher to travel through a greater area than the tail. As a result of the action of the flasher the tailing lure will have a wobbling uncertain swimming action with various changes in depth as well as zig-zagging action from side to side.

My improved flasher has been described primarily with respect to salmon fishing, but it will be appreciated that it will be effective for luring various other game fish as well.

It is thought that the invention will have been clearly understood from the foregoing detailed description of my now preferred illustrated embodiment. Changes within the spirit of my teachings may be resorted to without departing from the invention and it is accordingly my intention that the hereto annexed claims be given a scope in their construction fully commensurate with the broadest interpretation to which the employed language admits.

What I claim is:

1. A fish attractor formed from sheet material and having the general outline of a fish with its body including a head, a dorsal fin, and a tail, said body being moderately laterally concave from the back edge to the belly edge thereof and having a centrally struck longitudinal rib running the major length thereof with the furrowed side of said rib occurring on the laterally concave face of the attractor, a pull line opening in the body spaced rearwardly from its nose and spaced toward its back edge from the line of said rib, and a leader opening in the body at the tail thereof and alined with said rib, said attractor having a bend sloping forwardly from the base of said dorsal fin to the belly edge of the body and crossing said rib whereby said tail is offset angularly with respect to said head and whereby said body is slightly longitudinally concave and has the longitudinally concave face thereof coinciding with said laterally concave face thereof.

2. The attractor of claim 1 in which said pull line opening is spaced rearwardly of the forward end of said rib and is closer to the back edge of the body than to said rib.

References Cited in the file of this patent

UNITED STATES PATENTS

| | | |
|---|---|---|
| 1,681,316 | Waters | Aug. 21, 1928 |
| 2,088,775 | Davenport | Aug. 3, 1937 |
| 2,215,764 | Okesson et al. | Sept. 24, 1940 |
| 2,608,788 | Niemi | Sept. 2, 1952 |
| 2,736,982 | Curtis | Mar. 6, 1956 |

FOREIGN PATENTS

| | | |
|---|---|---|
| 958,469 | France | Mar. 9, 1950 |